Nov. 4, 1958     C. F. ROSENBLAD     2,859,108
METHOD FOR PREPARING DIGESTION ACID
FOR DIGESTION OF SULPHITE PULP
Filed May 25, 1954
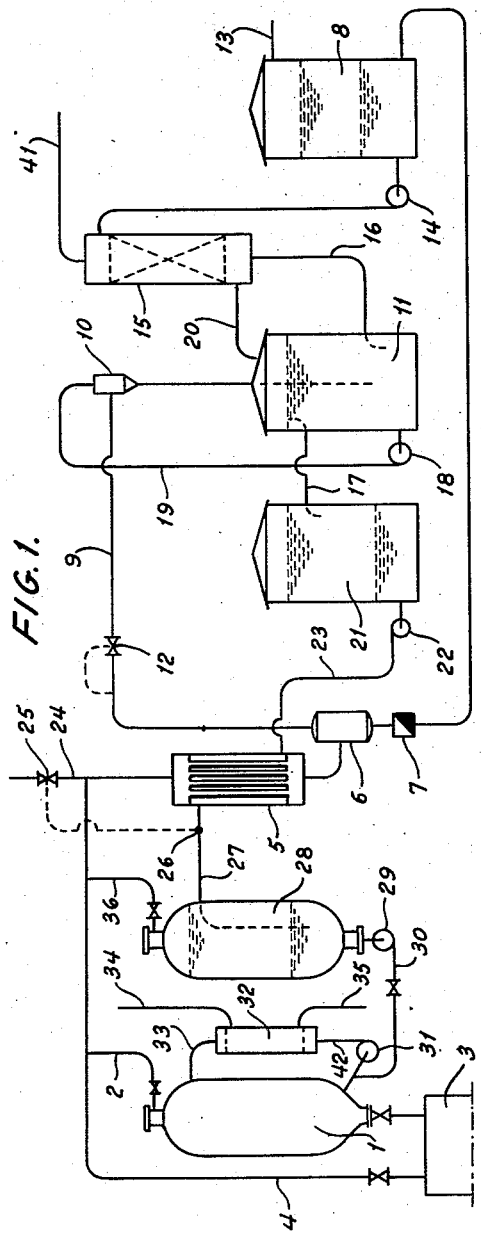
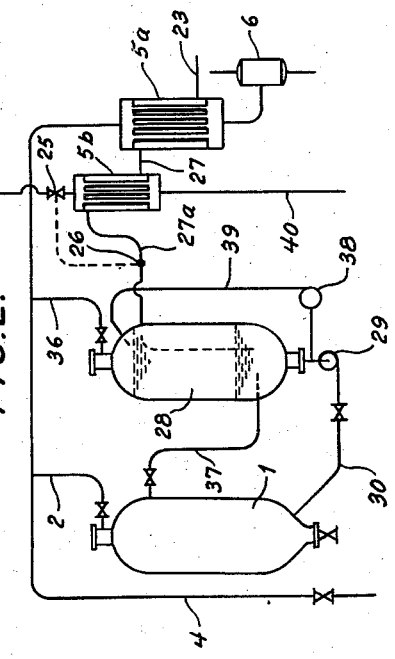
INVENTOR.
CURT F. ROSENBLAD
BY
*Albert M. Parker*
ATTORNEY.

United States Patent Office 2,859,108
Patented Nov. 4, 1958

2,859,108

METHOD FOR PREPARING DIGESTION ACID FOR DIGESTION OF SULPHITE

Curt Fredrik Rosenblad, Princeton, N. J., assignor to Aktiebolaget Rosenblads Patenter, Stockholm, Sweden Application May 25, 1954, Serial No. 432,242

Claims priority, application Sweden May 27, 1953

5 Claims. (Cl. 92—2)

This invention relates to the preparation of highly preheated digestion or boiling acid of high $SO_2$-content in sulphite cellulose digestion by the utilization of heat from gases and flash vapors relieved from the contents of the digester, the raw acid being gassed to at least substantially the desired concentration of $SO_2$ at substantially atmospheric pressure in contact with said gases in cooled condition, and the gassed acid subsequently being heated, while being utilized as a cooling medium for the indirect cooling of said gases and flash vapors.

According to Swedish specification No. 76,200 it is known, for instance, to accomplish this heating in the following manner:

The gassed acid is first utilized as a cooling medium at low pressure in a surface cooler for cooling gases and alternatively also waste liquor from the digester, while at the same time the acid becomes heated to a temperature which varies with the variations of the temperature and of the amount of the media supplied to said cooler from the digester. The acid thus heated is passed to a first pressure vessel in which the acid is accumulated before it is fed to a second pressure vessel from which it is ultimately fed to the digester. The feeding of acid of varying temperature from the first to the second pressure vessel is controlled or adjusted to keep the second pressure vessel full of acid at all times and to provide for a digestion acid of the desired high and even temperature being fed from the second pressure vessel to the digester, said second pressure vessel being provided with a steam heated circulation heating system for the further heating of the acid to that temperature.

It is an object of the invention to accomplish the heating of the digestion acid to its final stage in a new and more simple way.

The invention will be more particularly described with reference to the accompanying drawing, in which Fig. 1 illustrates diagrammatically and as an example in the form of a flow scheme a plant for preparing digestion acid and working according to the invention, and Fig. 2 a modification of part of the same plant to which the invention is particularly related. Identical details have the same reference characters in both figures.

From a digester 1 gases and vapors are withdrawn through a pipe 2. The digester is blown to a bin 3, and flash vapors containing gas are withdrawn through a pipe 4. All said gases and vapors are, according to the invention, passed to a common surface cooler 5, in which the gases are cooled and the vapors condensed. The cooled gases and the condensate are passed from the cooler 5 to a separator 6, in which they are separated. The condensate is then withdrawn through a trap 7 to a tank 8 for raw acid while the vapors, containing to substantial extent $SO_2$, are evacuated through a pipe line 9 by means of an injector 10 to the acid in a tank 11 for preparing digestion acid and in which substantially atmospheric pressure prevails. In the pipe line 9 a control valve 12 is arranged to maintain the vacuum in the vapor space of the cooler 5 at a constant value.

The raw acid, supplied to the system through a pipe 13 to a tank 8, is pumped therefrom by means of the pump 14 to an absorption tower 15 and from there through a pipe 16 to the tank 11 in which the liquid level is maintained constant by means of an overflow pipe 17. The acid in this tank is circulated by means of a pump 18 from the tank through a pipe 19 and the injector 10 back to the tank, thus the acid serves as driving medium for the injector and becomes saturated with $SO_2$-gas injected through pipe line 9. $SO_2$-gas which possibly has not been absorbed by the acid passes through a pipe 20 to the absorption tower 15 in which it is at least partly absorbed by the passing raw acid in which case the remaining $SO_2$ is passed through a pipe 41 to the acid tower (not shown in the figure).

The gassed acid while still comparatively cool is passed from the tank 11 through the overflow pipe 17 to a buffer tank 21 from which the acid is pumped at a constant rate of flow by means of a pump 22 through a pipe 23 to the cooler 5, in which the acid is used as cooling medium and, at the same time, is heated. As the gases and vapors from the pipes 2 and 4 are supplied to the cooler intermittently and at varying temperature in accordance with the separate stages of the digestion process, this heating would be very irregular unless special steps be taken. Therefore, according to the invention, in addition to the gases and vapors arriving from the digestor, a vaporous heating medium, for instance live steam, is also supplied to the hotter-medium space of cooler 5 through a pipe 24 provided with a control valve 25, which is actuated from a thermostatically controlled member 26 in the outlet 27 for acid from the cooler 5, so as to be opened when the temperature in said outlet tends to sink below a predetermined value and to be closed, when said temperature tends to exceed the same value. In that way the constant flow of acid is heated to a constant temperature which also may be higher than the maximum temperature obtainable by heat exchange with the gases and vapors from the digester alone.

The flow of digestion acid thus heated to a constant and high temperature is subsequently passed through the outlet 27 to a hot acid pressure vessel 28 in which it is accumulated and in which the pressure is high enough to ensure that the $SO_2$-gas remains absorbed in the acid at that temperature. It is to be observed that as the same pressure exists in the liquid-space of the cooler 5 communicating with the pressure vessel, the same security of keeping the $SO_2$ absorbed in the acid is obtained during the whole heating process.

The pressure vessel may, however, be relieved of gas through pipe 36. During the charging period hot digestion acid accumulated in pressure vessel 28 is pumped to the acid circulation system of the digester 1 by means of a pump 29 through a pipe 30. Said circulation system includes a pump 31, a heater 32, connection pipes 42 and 33 and steam and condensate connections 34 and 35 respectively.

It is obvious that in a system for preparing digestion acid of the kind now described only one hot acid vessel stage is needed instead of two such stages as is the case in the exemplified prior art, which means that much less pressure-vessel volume is needed. Moreover, the heating means may be much simpler and the temperature of the digestion acid becomes absolutely uniform at all levels in the hot acid vessel.

In the modification according to Fig. 2 direct boiling or digestion is presupposed. In this case it may be expedient to withdraw digestion acid from the digester during the digestion process through a pipe 37 to the hot acid pressure vessel 28 whereby said vessel should be combined with a circulation system comprising a pump 38 and a circulation pipe 39 by means of which the acid in the vessel may be circulated to equalize tendencies of unequal temperature distribution due to the supply of digestion acid. Further a cooler 5a and a heater 5b substituted for the cooler 5 in Fig. 1, so that the gases and vapors from the digester are cooled in the cooler 5a under the same conditions as in cooler 5, while the final temperature of the digestion acid is adjusted to the desired constant level in the heater 5b in heat exchange with the additional heating medium alone which is supplied through the pipe 24 and withdrawn through the pipe 40. The object of this modification is to enable utilization of an additional or make up heating medium which could not without disadvantage be allowed to mix with the gases and vapors from the digester, or which requires a higher pressure than that in the cooler 5 or 5a respectively, so as to ensure a final heating of the acid to the desired temperature. The additional heating medium may be a hot vaporous medium, for instance live steam, or a hot liquid, for instance hot spent liquor from the boiling process.

The embodiments of the invention here shown and described are intended to serve as examples only and it is of course possible for a person skilled in the art to make further modifications within the scope of the invention.

What I claim is:

1. A method of producing highly preheated digestion acid with high $SO_2$-content in sulphite cellulose digestion processes comprising in combination the steps of passing $SO_2$-gases and $SO_2$-gas containing vapors relieved from a digester at various pressure and temperature to a common surface cooler system in which the vapors are condensed and the gases cooled, passing such cooled gases in contact with raw acid at substantially atmospheric pressure so as to substantially saturate the raw acid with $SO_2$-gas at said pressure, passing a substantially continuous flow of the said saturated acid at a pressure high enough to maintain the $SO_2$-gases dissolved in the acid at a desired final temperature as cooling medium through the aforesaid surface cooler system, where the flow of acid becomes heated in heat exchange with the gases and vapors from the digester, supplying additional heat to the flow of acid thus heated, controling the rate of additional heat supply in accordance with the variations in heat supplied with the gases and vapors from the digester so as to heat the flow of acid uniformly to the desired final temperature and passing said acid heated to said final temperature to a pressure acid accumulator in which is maintained a pressure high enough to maintain the $SO_2$ gases dissolved in the acid.

2. A method as claimed in claim 1, in which the additional heat is supplied to the flow of acid in the form of vaporous heating medium.

3. A method as claimed in claim 1, in which the additional heat is supplied to the flow of acid in the form of hot medium which is passed in heat exchange with said flow in the same cooling system as the gases and vapors from the digester.

4. A method as claimed in claim 1, in which the additional heat is supplied to the flow of acid in the form of a hot medium which is passed in heat exchange with said flow in a heat exchanger separated from the cooler system for the gases and vapors from the digester.

5. A method as claimed in claim 1, in which the rate of additional heat to the flow of acid is controlled so as to increase when the temperature of this flow on leaving the heating process tends to sink below its predetermined final temperature and so as to decrease when said temperature tends to rise above the same final temperature.

References Cited in the file of this patent
UNITED STATES PATENTS

| | | |
|---|---|---|
| 1,904,170 | Richter | Apr. 18, 1933 |
| 1,918,459 | Dunbar et al. | July 18, 1933 |
| 1,991,365 | Adams et al. | Feb. 19, 1935 |
| 2,038,780 | Adams et al. | Apr. 28, 1936 |
| 2,091,513 | Merrill | Aug. 31, 1937 |
| 2,152,267 | Merrill | Mar. 28, 1939 |
| 2,235,759 | Frankel | Mar. 18, 1941 |
| 2,418,167 | DuBois | Apr. 1, 1947 |
| 2,494,098 | Lockman | Jan. 10, 1950 |